(12) United States Patent
Feldmeier

(10) Patent No.: US 7,340,765 B2
(45) Date of Patent: Mar. 4, 2008

(54) ARCHIVING AND VIEWING SPORTS EVENTS VIA INTERNET

(76) Inventor: Robert H. Feldmeier, 7632 Hunt La., Fayetteville, NY (US) 13066

( * ) Notice: Subject to any disclaimer, the term of this patent is extended or adjusted under 35 U.S.C. 154(b) by 82 days.

(21) Appl. No.: 11/220,028

(22) Filed: Sep. 6, 2005

(65) Prior Publication Data

US 2006/0023117 A1    Feb. 2, 2006

Related U.S. Application Data

(63) Continuation-in-part of application No. 10/677,934, filed on Oct. 2, 2003, now abandoned.

(51) Int. Cl.
*H04N 7/173* (2006.01)
*H04N 7/03* (2006.01)
*G06F 3/00* (2006.01)

(52) U.S. Cl. ............. 725/92; 725/37; 725/115; 725/142

(58) Field of Classification Search .......... 725/89, 725/110, 37, 87, 92, 115, 142, 145; 705/1
See application file for complete search history.

(56) References Cited

U.S. PATENT DOCUMENTS

| | | | | |
|---|---|---|---|---|
| 6,307,550 | B1 * | 10/2001 | Chen et al. | 345/418 |
| 6,378,132 | B1 * | 4/2002 | Grandin et al. | 725/146 |
| 6,546,555 | B1 * | 4/2003 | Hjelsvold et al. | 725/1 |
| 6,564,380 | B1 * | 5/2003 | Murphy | 725/86 |
| 6,614,729 | B2 * | 9/2003 | Griner et al. | 369/1 |
| 6,631,522 | B1 * | 10/2003 | Erdelyi | 725/53 |
| 6,760,916 | B2 * | 7/2004 | Holtz et al. | 725/34 |
| 6,774,926 | B1 * | 8/2004 | Ellis et al. | 348/14.01 |
| 6,795,638 | B1 * | 9/2004 | Skelley, Jr. | 386/52 |
| 6,810,397 | B1 * | 10/2004 | Qian et al. | 707/6 |
| 6,877,010 | B2 * | 4/2005 | Smith-Semedo et al. | 707/102 |
| 6,882,793 | B1 * | 4/2005 | Fu et al. | 386/95 |
| 2001/0034734 | A1 * | 10/2001 | Whitley et al. | 707/104.1 |

(Continued)

OTHER PUBLICATIONS

Matthew Symonds, The Impact of Division II Revenue and Non-Revenue Sport Participation on Student Management, University of Missouri—Columbia Dissertation—Dec. 2006 (pp. 13-14).

(Continued)

*Primary Examiner*—Christopher Grant
*Assistant Examiner*—Chris Parry
(74) *Attorney, Agent, or Firm*—Bernhard P Molldrem, Jr.

(57) ABSTRACT

Self-help or do-it-yourself productions of collegiate athletic contests are generated by the originating institution, and the recorded production is sent by overnight courier to a central digital clearing house. At the clearing house the contents of the recording are loaded onto a computer processor and the video and audio channels are digitally processing to prepare the program for digital storage and retransmission. A web transmitter processor transmits the video recordings of these events to subscribers on demand over wide-band, high-speed Internet connections. The content may be edited at the clearing house. The clearing house provides a custom video player or viewer for each recorded production. The games or meets can be selected by the subscriber, which are indexed in categories including originating institution, type of event, and date of event. The events may also be webcast live or near-real-time, as well as archived.

18 Claims, 4 Drawing Sheets

U.S. PATENT DOCUMENTS

| | | | |
|---|---|---|---|
| 2002/0038456 A1* | 3/2002 | Hansen et al. | 725/46 |
| 2002/0056119 A1* | 5/2002 | Moynihan | 725/87 |
| 2002/0083005 A1* | 6/2002 | Lowenstein et al. | 705/57 |
| 2002/0120939 A1* | 8/2002 | Wall et al. | 725/87 |
| 2003/0001880 A1* | 1/2003 | Holtz et al. | 345/716 |
| 2003/0110209 A1* | 6/2003 | Loui et al. | 709/203 |
| 2003/0167251 A1* | 9/2003 | Samuel | 707/1 |
| 2003/0218625 A1* | 11/2003 | Allison | 345/716 |
| 2003/0220813 A1* | 11/2003 | Gurvey | 705/1 |
| 2004/0027369 A1* | 2/2004 | Kellock et al. | 345/716 |
| 2004/0125877 A1* | 7/2004 | Chang et al. | 375/240.28 |
| 2004/0131330 A1* | 7/2004 | Wilkins et al. | 386/55 |
| 2004/0197088 A1* | 10/2004 | Ferman et al. | 386/117 |
| 2006/0173701 A1* | 8/2006 | Gurvey | 705/1 |

OTHER PUBLICATIONS

Brendan Murphy, Big Green Figure Skating Ices the Competition, ESPN sports.espn.go.com/newsstory?id=2931958, 2007.

* cited by examiner

ARCHIVING AND VIEWING SPORTS EVENTS VIA INTERNET

This is a Continuation-in-Part of U.S. patent application Ser. No. 10/677,934, filed Oct. 2, 2003 now abandoned.

BACKGROUND OF THE INVENTION

This invention relates to self-help and do-it-yourself video and audio production and transmission of sports events and other events such as lectures, and is more particularly concerned with a technique in which a number of smaller institutions can produce video recordings or live webcasts of their events and send them to a common clearinghouse which will webcast the events to subscribers, i.e., to persons who wish to view the events. The invention is likewise related to employment of a central clearing house for the videos as an effective means of producing and transmitting webcasts of so-called minor sports, including meets, games, tournaments and championships.

The common digital clearing house provides a single, common location for gathering and processing all the recorded video productions for the various institutions (e.g., schools, clubs, and associations) and for processing these to make them suitable for transmitting via the Internet and for a subscriber viewing them on a computer monitor.

The invention is also concerned with the archiving of a number of do-it-yourself webcasts of events, e.g., college wrestling meets, for a given season, for a number of institutions, i.e., colleges and universities, which can be produced in-house by the athletic department of the college or university, and can be viewed via the Internet by subscribers at times and locations convenient to the subscriber. The webcasts may be live productions or video recordings.

At the present time, video productions of college athletics are limited to major sports only, e.g., football and men's basketball, and then only for a selected ones of the major universities. Because of the high cost associated with producing a sports event for national broadcast, there is little interest in producing video broadcasts for smaller colleges or for so-called minor sports such as track, wrestling, swimming and diving, tennis, or soccer, other than when the game or meet involves a championship. Because of the small market involved with these minor sports and with smaller colleges, it is difficult for a major network to sell advertising time at prices that would support the costs of the production. For that reason, it is difficult for an alumnus or other person interested in a particular college to view that institution's games and meets, unless he or she happens to be in the local area on the day of the contest.

Currently, television networks are very selective as to which events they produce and when the events are to be shown. Minor sports such as wrestling, lacrosse, swimming and diving, track and field, and others seldom appear on the television networks, and are rarely produced even at local stations. Moreover, when these sports are shown on television, they are rarely shown at prime time, and almost never shown in their entirety. Television network-produced sports events are only one possible source of video content.

In order to televise an athletic event or other event, the television company either furnishes its own staff to produce the event or hires a subcontracting production company. The event owner, e.g., the college athletic department or the collegiate conference, provides the content, i.e., furnishes the teams and officials. Accordingly, there is not always agreement between the schools and the networks as to what should be included in the telecast or other video production. Also, the requirement for a video production company to furnish its own professionals and production equipment makes the production expensive and rather complex.

A number of systems and arrangements now exist for transmitting video material over a computer network, e.g., from a small network such as a LAN to widely available networks such as the Internet or other global computer network. This can involve a computer or server that is connected to some source of video content, which may be live or recorded, and which includes means for transmitting, i.e., webcasting, the content over the network to other computers on the network. Often the systems include some means, such a graphical user interfaces, to permit the users of such computers to facilitate user access and to select desired content. A few of these systems are described in Stern U.S. Published Pat. Appln. 2003/0052916; Feuer Published Pat. Appln. 2003/0005437; Wall et al. Published Pat. Appln. 2002/0120939; Moynihan Published Pat. Appln. 2002/0056119; and Holtz et al. Published Pat. Appln. 2002/0053078. However, while this technology does now exist, no one has considered applying it to the problem of how to provide access to college sports events, either live or recorded, in a manner that is convenient and inexpensive both to the viewer and to the institution.

To date, all video production, both live and archived, requires an outside producer, either furnished from a broadcast station, network or outside contractor. Colleges do not produce video broadcasts on their own of their sports events or other campus events. Some team or game tapes are made for special purposes, i.e., for teams and coaches to review their teams' performance, but these are not broadcast. Even those institutions that do have a video journalism school do not produce video broadcasts of games or meets of the school's teams, and do not archive films or video tapes of these events for web access later on.

While it is possible for an individual or institution to generate a video program and have it aired, e.g., through a local cable system public affairs channel, the institution is entirely responsible for making the program ready for airing, and there is no systemized way for editing, trimming, or enhancing the video program at the local cable station. All that the local cable system will do is to list the video program on its schedule. There are no means available for generating revenue to cover the cost of producing the event of this nature when it is televised, cable-cast or otherwise aired.

OBJECTS AND SUMMARY OF THE INVENTION

It is an object of the present invention to provide a school or other organization with a self-help or do-it-yourself process for webcasting games, meets, sports events, and the like.

It is a related object to provide a system based on a webcasting clearing house for showing live or archived events to interested viewers.

It is another object of the invention to provide to persons who are interested in observing a particular event or activity the ability to see and hear the event, live or archived, at a convenient time and location of the persons's choosing.

It is another object to provide alumni, fans, and other persons with a means to view sports events or other events that are not normally available via either on-air or cable television.

It is a further object to provide organizers or owners of sports events or other events the ability to show their events to a worldwide audience via the Internet through broadband, wire or wireless means, either live or archived.

It is another object to provide a technique for producing a video production of a sports event or other event at low cost, and which is simple enough to produce so that the owner or organizer can produce the video and audio using its own personnel.

It is yet a further object to reduce the costs involved in transmitting the video production of the event to remote viewers, by relieving the owners or organizers of the event of the costs of maintaining webcasting equipment and facilities.

It is a further object to provide a technique and system in which the necessary editing, including any trimming, inserting of audio, or titling, and preparing the videos for presentation to subscribers on the Internet are carried out at the central clearing house, making the production of these events as simple and convenient as possible for the personnel at the club, college, university, or other institution to have video presentations of high quality presented to viewers.

According to one aspect of the invention, events that are of interest to groups of interested persons are produced at the venue of the event, and the video productions are processed and transmitted as self-help or do-it-yourself videos, via a clearing house, where they are transmitted, live or as recorded events on demand, to subscribers, i.e., the above-mentioned interested persons. The video productions of these events are produced by the respective originating institutions, e.g., colleges, and these events are categorized into one or more identifiable categories of events, i.e., by college or college athletic conference, and by sport, e.g., men's wrestling, women's swimming and diving, etc.

The college athletic department can use its own members or college students as a production team to produce a video recording of each such event. This can involve a video recording taken from one video camera or a recording that is created from two or more cameras, plus at least one audio channel. The video material, which also includes event audio plus commentary, is transmitted, either electronically or physically, to a central digital clearing house. This can involve sending a video tape cassette, of any convenient format, by an overnight express courier to the clearing house. At the clearing house the contents of the tape cassette are loaded onto a computer processor and the video and audio channels are digitally processed to streamline the data and prepare the program for digital storage and retransmission. The content is stored in a digital memory arraignment with capacity sufficient for storing a multiplicity of these video recordings from this college or institution as well as video recordings from many other institutions. The video and audio channels of the video recordings of these events are converted to a digital form, and stored at storage locations on the associated digital memory arrangement. The video and audio can be recorded in digital form, and the data, that is, the video and audio content, are edited for presentation. The editing can involve trimming dead time from the videos files, inserting music, creating highlights, adding titles, and/or dividing the entire video file into segments of interest. This editing is in addition to the conversion of format that is or would be required. This editing of the content is carried out at the central clearing house and ensures a quality viewing experience, while permitting the production personnel at the institution to concentrate only on capturing the event in as simple and straightforward a manner as possible. Depending on the nature of the event and the quality of the video material received at the clearing house, the editing may be minimal, or the entire video file can be reworked at the clearing house. A web transmitter associated with the clearing house computer processor transmits the video recordings of these events to the subscribers on demand, that is, each program can be transmitted over the Internet to that subscriber when he or she selects the material.

The clearing house computer processor creates a subscriber accessible index of the video recordings stored in the memory arrangement at said clearing house, the index having categories including originating institution, type of event, and date of event. The recorded games, meets, or other events are then provided to subscribers having digital access, via the Internet or other global computer network. The interested persons are provided subscriber access via the global computer network to the index, and the subscriber can select one or more categories, i.e., a specific college, or a specific sport, as listed on the index. Then the subscriber selects a desired video recording of an event within the selected one or more categories.

The clearing house computer processor verifies access authorization for any such subscriber that is seeking access to said stored video recordings for viewing same. The subscriber may be charged an annual or monthly access fee, or may pay per event viewed.

Then the selected video recording is web-transmitted to that subscriber over the global computer network.

The system also may have the capacity for live or near-real-time webcasting of events. In that case, the event may be transmitted in real time to the clearing house, via Internet or via a dedicated connection. The event is archived for viewing later in the manner described above as well as being offered as a live webcast event.

In other words, a central computer facility serves in effect as a digital clearing house that is set up to receive recorded sports videos and live sports videos. The recorded events could include other types of events besides sports, such as lectures, college commencements, recitals and concerts that the institution or owner wants produced. These video productions are stored in the form of digital recordings, and can be reproduced and can be edited, if necessary. The facility i.e. clearing house then catalogs the events and they are indexed by the producer (college, university, etc.) and by the classification of the event so that the viewer can select a particular game or meet for viewing. Then when the viewer has made his or her selection, the video material is transmitted via Internet to the viewer.

Revenue for the clearing house facility, and for the institution (i.e., college athletic department) can come from viewer subscriptions, or from viewers paying for specific events that they may want to view. Alternatively or additionally, commercial advertisements carried with the webcast may contribute revenue. The term "subscriber" is used here to refer to viewer, and these subscribers need not necessarily be charged a fee, as a different revenue model may apply.

If a viewer wants to see swimming and diving, for example, he or she could select the "swimming and diving" category, and a list of a number of swim meets would appear on screen, and the viewer could then select the particular meet he or she wants to see. These can be selected by school, conference, date, and as regular season dual meet or conference or regional championship, for example. Alternatively, if the viewer is interested in the sports at a particular college, then the viewer can select the specific college, and all the events that have been submitted for that college (or featuring that college if submitted by another college or by the conference) would appear, and the viewer can choose from those events.

In a preferred embodiment, the clearing house creates a custom video player for the televised video events. The video player appears as a window on the screen of the subscriber's computer monitor, with an area where the video material is presented. This video player then can have name of the school (or other institution), the identity of the athletic contest, the weight class involved or other event, and other items such as images of the school logo and/or mascot. In addition, an event preview screen is also created, which can have e.g. small pre-view screens or thumbnails that can the viewer can use to select, i.e., click on, the associated segment of the video program, e.g., by point-and-click selection. There can be other items included here, e.g., advertising or announcements, or links to related items.

In the embodiments of this invention, a simple control box is used with up to two camera inputs and two microphone inputs. This is usually plenty of video coverage for an athletic event such as wrestling, swimming, hockey, or the like. There are two screens, and means permitting an operator to switch between camera one and camera two, depending on the view from those camera angles. A control board allows the operator to select an audio balance between the microphones. Typically one microphone would be at an announcer's position and another at a position that captures crowd noise, background, and the sounds of the event itself.

The above and many other objects, features, and advantages of the arrangement(s) of the present invention will become apparent from the ensuing detailed description of preferred embodiments of the invention, when considered in connection with the accompanying Drawing.

DETAILED DESCRIPTION OF THE PREFERRED EMBODIMENT

Figure 1:
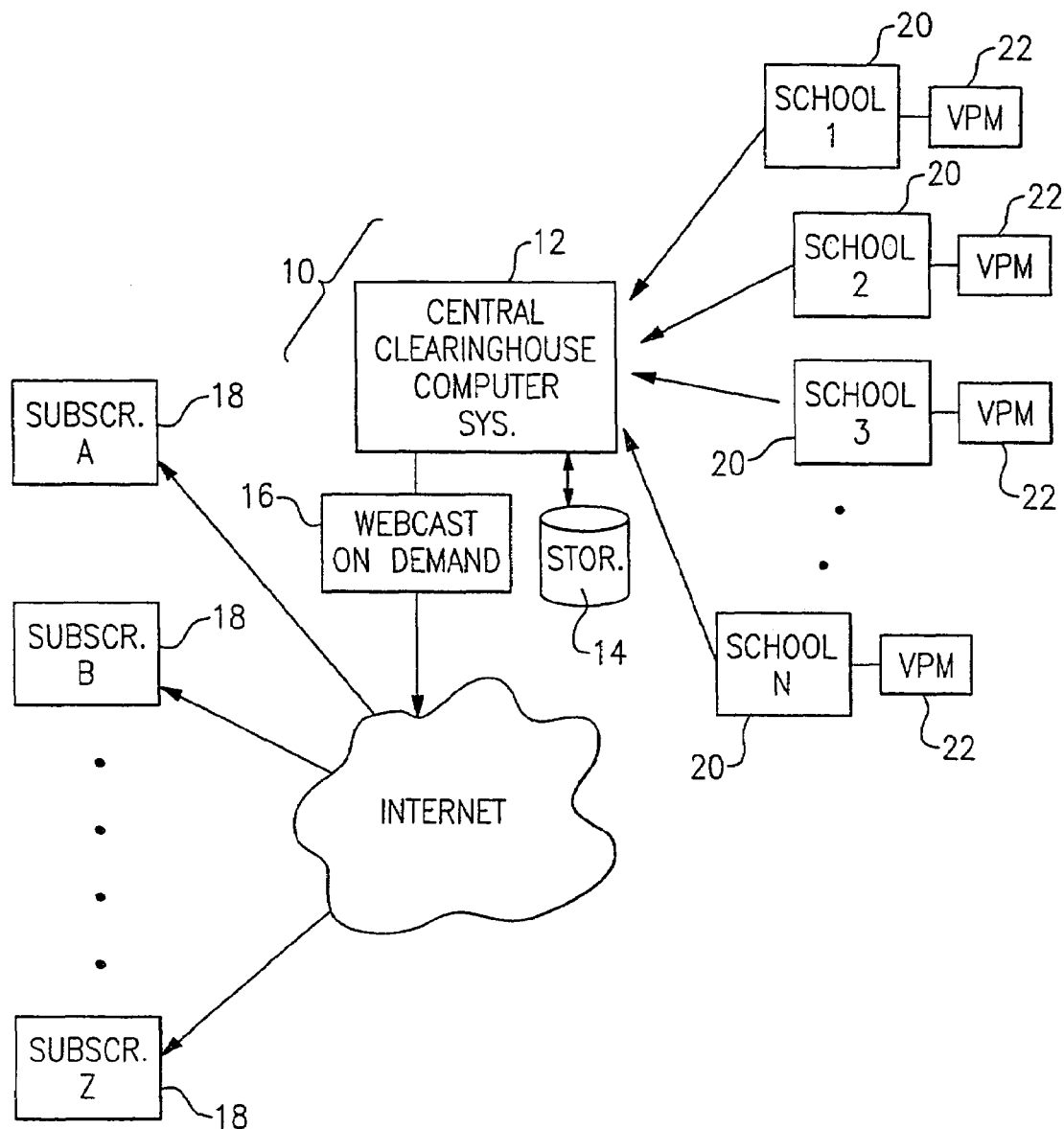
FIG. 1 is a schematic system view of a web-based system of an embodiment of the invention for archiving video records of events and transmitting them on demand to subscribers.

With reference to the Drawing, FIG. 1 is a general schematic view of the system 10 for receiving, storing, and webcasting of sports events or other events that may have an audience that is too small to justify the expense of a regular on-air television production. Here, at the heart of the system 10 is a central clearinghouse computer system 12 that receives the sports videos produced by various schools, clubs or other institutions, and presents the video recordings of these events by webcasting them to subscribers that visit the clearinghouse Internet web site. The televised sports events are stored on a digital memory arrangement 14 associated with the clearinghouse computer system 12, and there is also an on-demand webcast facility 16 that obtains the digital video recordings of the sports events and transmits them over a wide-band, high speed connection, via the Internet, to authorized subscribers 18. In this embodiment, there are a number of subscribers 18, each of which has computer access to the Internet over a cable modem, DSL, or another high-speed connection capable of supporting near-television quality reproduction of the sports events.

A number of institutions 20, i.e., universities, colleges, high schools, athletic conferences or athletic leagues provide the video content, that is, institutions generate the video production of the sports or athletic events, and transmit these to the central clearing house 12. Here the institutions are indicated as School 1, School 2, and so forth, to School N. However, these organizations that produce their own webcast or recorded events are not limited to educational institutions, and may include minor league baseball or hockey teams, clubs, commercial or government bodies, or individuals. Each institution 20 has a video production module 22, described later, which it uses to make its video productions of events using its own staff, e.g., students or members of the athletic department. Portable, i.e., shippable, video recordings (e.g., VHS cassettes, 8-mm, mini-DVD, or other optical disks) of the athletic events, i.e., swimming, wrestling, skiing, hockey, figure skating, lacrosse, etc., are sent by overnight express courier (or uploaded over the Internet) to the central clearing house.

The clearing house computer receives and catalogs or classifies the video productions received from the various participating schools and other institutions. These are categorized and indexed in terms of the institution or institutions, i.e., the home and visiting teams; the sport involved, e.g., wrestling, men's swimming and diving, women's lacrosse, etc.; date of the event; and other criteria as appropriate, such as championship game or meet, or playoff game. These categories are indexed and presented on the clearing house web page, so that the subscriber 18 (or other authorized viewer) can click on the category to select a particular game or meet. The various subscribers can watch different events at the same time or at different times, or may view the same archived event at different times of their own convenience and choosing.

Figure 2:
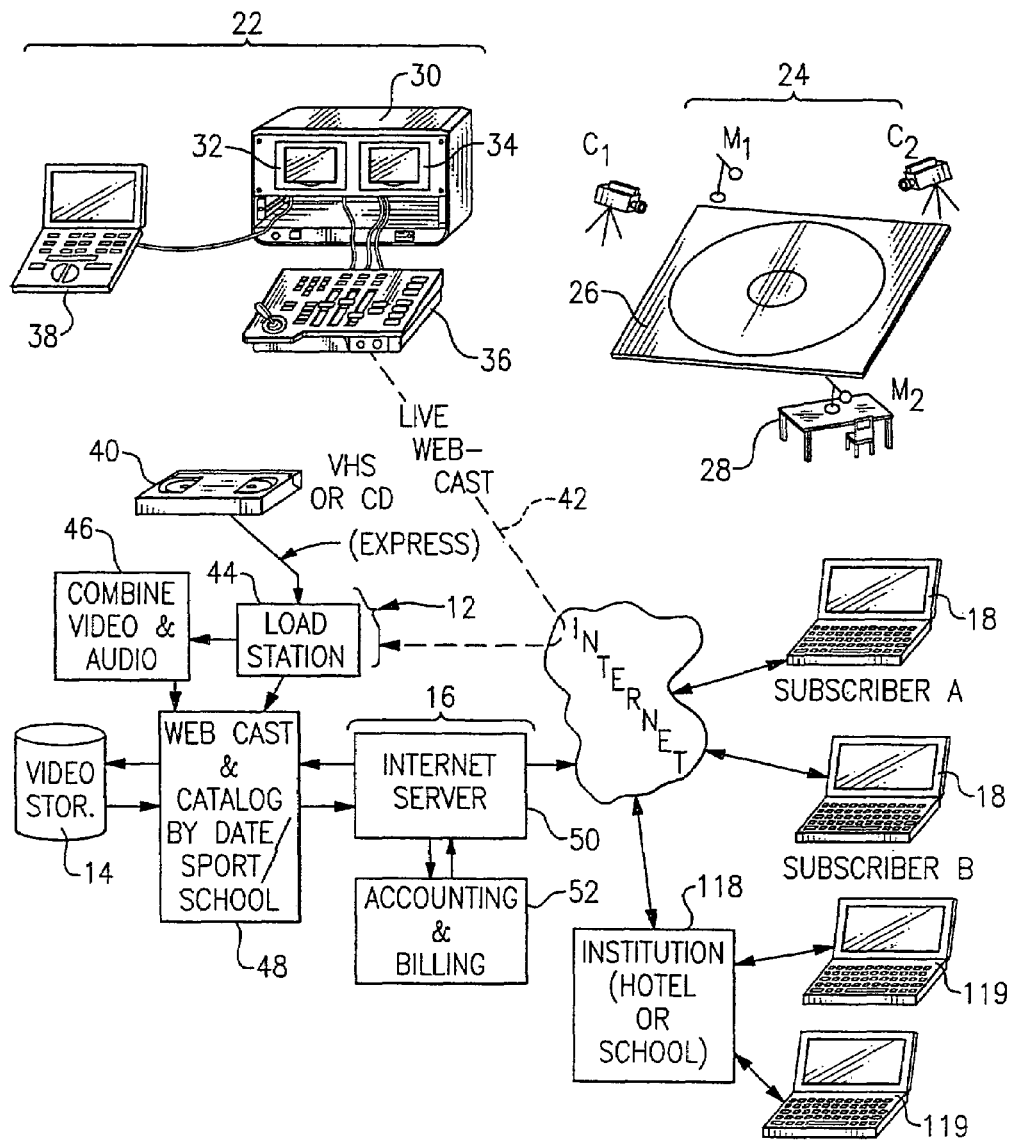
FIG. 2 is a schematic view explaining the use of this system in connection with the recording and transmitting of an athletic event.

An example of the production, digital storage, and later webcasting of a particular sports event and a given scholastic institution is shown in FIG. 2. Here, the home or host institution provides a venue 24, and in this example this is a wrestling venue within an arena or gymnasium. Here, there is a wrestling mat 26, with an announcer's table 28 to one side, which may be shared with wrestling officials, scorers, timers, and the like. A first video camera C1 and a second video camera C2 are positioned at different places off the mat 26 to produce camera shots from different angles. There is a first microphone M1 positioned to pick up sounds of the audience and of the event itself, and a second microphone M2 at the announcer's table. There are feeds from the cameras C1, C2 and mikes M1, M2 to the video production module 22, although these feeds are not shown here. The video production module 22 includes an equipment module 30, in the form of a case or housing containing electronics, with dual video screens 32, 34, i.e., LCD panels that display the pictures coming from the cameras C1, C2, respectively. A control board or control panel 36 slides out from a recess beneath the video screens and provides controls for sound balance, camera selection, and other video features. An associated small computer 38 is used for producing titles and graphics that can be inserted or overlaid on the video pictures, including e.g. scoreboard information such as the period, names of the wrestlers, weight class, points awarded, and time remaining in the period. In some embodiments, a video recorder can be incorporated into the module 30.

The computer 38 is not necessary to the process where the event is tape recorded and the tape is expressed by courier to the clearing house. The computer is not necessary to enhance the production. However, in the case where there is a live video webcast, the computer 38 would contain software and processes for streamlining the digital video and audio so that it can be transmitted via Internet to the clearing house for live webcast, and for later on-demand viewing.

At the end of the meet, the video material is recorded, e.g., on a VHS cassette 40, another format of video tape, or other means such as an optical disk (CD or DVD), and the recording is sent by a standard commercial overnight courier service or by mail to the clearinghouse location. Alternatively, i.e., in the case of an event that is being produced both for live webcasting and for archived storage and later on-demand viewing, the institution can transmit the live video directly or over a wide-band, high-speed Internet connection 42 to the clearinghouse.

At the central clearinghouse, the video record received from the institution is loaded at a load station 44, and the video and audio content are digitized and the digital video and audio data streams are combined in digitization facility 46. A webcast facility 48 includes a cataloging facility that indexes the televised event to be archived in terms of the date of the event, the school or schools involved (or conference or league, as appropriate), and sport (in this case wrestling). An Internet web server 50 interfaces between the clearinghouse computer system 12 and the Internet, and also is associated with an accounting and billing facility 52, which may be hardware or software, to identify authorized users and account for viewing time and which archived (and/or live) webcast events may be viewed by a particular subscriber or other user.

In this example, there are a number of individual subscribers 18, 18 each of which has a personal computer coupled over a high-speed broadband connection (i.e., video cable or DSL) to the Internet. Another class of subscriber may be included, and in this case an institutional subscriber 118, which may be a hotel, has an internal network or LAN, and guests 119 may plug in their computers to the hotel LAN to connect to reach the Internet, and to reach the clearinghouse web site. The hotel or similar institution 118 may provide this connection as a service, free or for a charge, to its guests. Another example of institutional subscriber may be a college that permits its students to view the archived sports events stored at the clearinghouse facility.

A number of business models may present themselves for the use of this system, depending on the nature of the schools or other institutions. In one example, the subscribers 18, 118 would pay a monthly or annual fee, and be provided with access, which may be unlimited, or may be limited to some specific sports events or some specific scholastic conferences. In another revenue option the system could charge the viewer by the hour. For example, the viewer could purchase 100 hours for $100, or thirty hours for $50. This option would address the problem of free-riding, from viewers sharing their password with others. In another example, each school athletic department would pay an annual fee for the archiving and webcasting on demand of its wrestling meets or other events. In that case, paid commercial advertising could be inserted on behalf of commercial sponsors, e.g., between various wrestling classes or at time outs, or at other appropriate times, such as between half-innings in a televised baseball contest.

Figure 3:
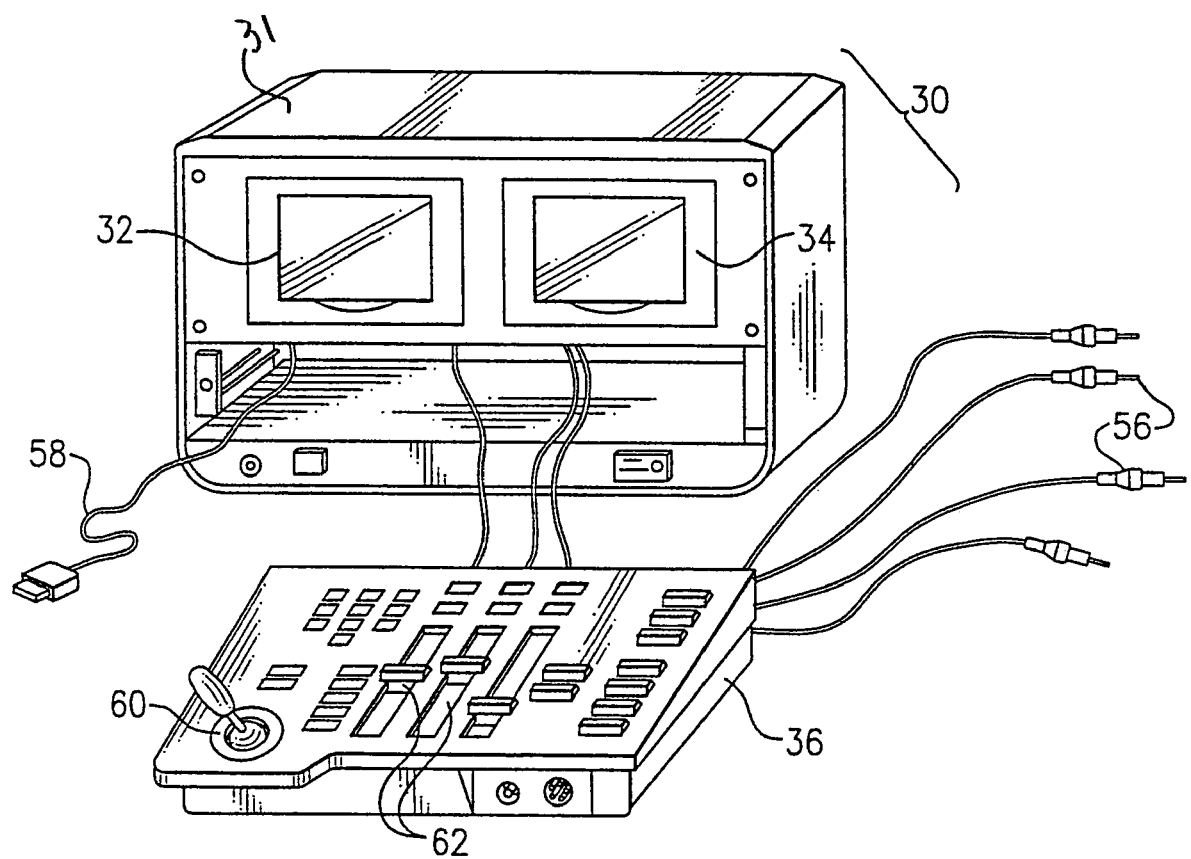
FIG. 3 is a perspective view of a control box employed in connection with an embodiment of the invention.

FIG. 3 shows the arrangement of the video production equipment module 30 of a preferred embodiment.

The two video screens 32 and 34 are mounted side-by-side in a panel at the upper part of the module within a housing 31 of the module. Here, a removable front cover (not shown) has been removed. Other electronics are housed behind the screens 32 and 34. As mentioned before, the screens are preferably small flat-panel LCD display units.

A shelf or slide 54 that is positioned in a recess below the screens 32, 34 mounts the control board 36, so that the latter pulls out for use, but can be stored compactly within the housing 31 of the module 30. A number of video and audio cords 56 extend from the module to connect with the cameras, microphones, video recorder, or other equipment, and a computer cable 58 permits the unit to be attached to a conventional port of the computer 38.

As shown here, the control board 36 has a toggle 60 that permits the operator to switch between the two cameras C1 and C2, based on the pictures displayed on the screens 32, 34. The control board also has a several sound balance slide controls 62. Additional controls, switches and push buttons, not discussed in detail here, control the color balance, contrast, brightness, and image quality of the video, and these controls are well known to video engineers.

The clearing house receives the tape cassette, DVD, or other media that the school or other institution sends in, and loads its contents into computer processor of the computer system 12. The video and audio channels are digitally processed to streamline the data and prepare the program for digital storage and retransmission. The content is stored in the digital memory or storage arrangement 14 as a video file, where there are a multiplicity of these video recordings from this and other colleges and institutions. The video and audio recorded in digital form are edited for presentation. The editing can involve trimming dead time from the videos files, inserting music, creating highlights, adding titles, and/or dividing the entire video file into segments of interest. For example, in a wrestling meet, there can be a respective segment for each weight class, so the subscriber or viewer can access the video of the match at that weight class. This and other editing as carried out at the central clearing house ensures a quality viewing experience. The editing and finishing activities at the clearing house frees the production personnel at the institution to concentrate only on capturing the event in as simple and straightforward a manner as possible, keeping in mind that these personnel are usually members of the athletic department, and not professional video or television personnel. Depending on the nature of the event and the quality of the video material received at the clearing house, the editing may be minimal, or the entire video file can be reworked at the clearing house.

Figure 4:
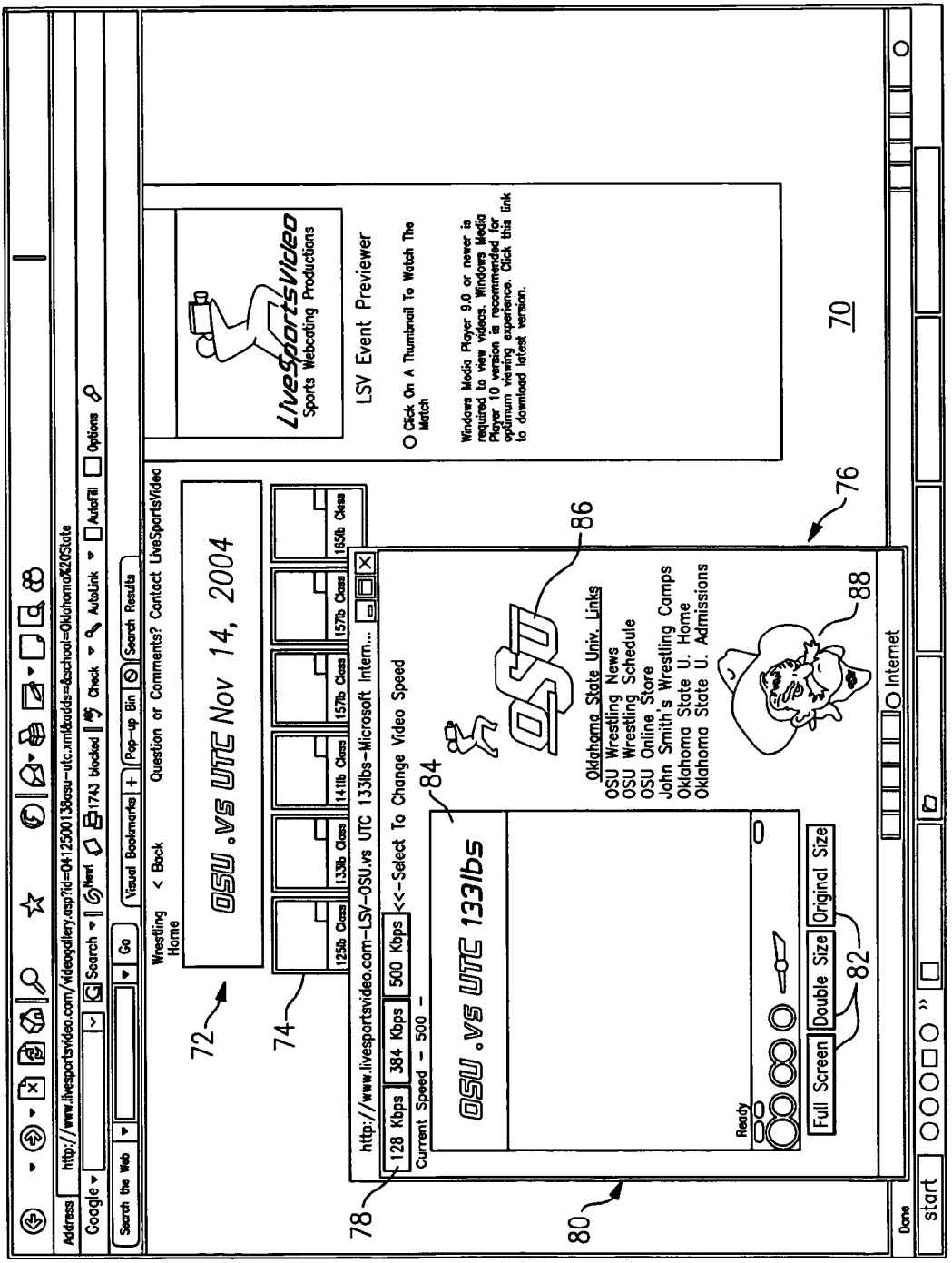
FIG. 4 is a view of a screen image presented to the subscriber, showing a preview screen and the video player window, according to an embodiment of the invention.

FIG. 4 illustrates a video screen 70 in a form that is presented to the viewer or subscriber on the video monitor of the subscriber's computer or equivalent Internet appliance. This video screen uses the subscriber's Internet browser, and presents the video material, supplied on demand to the subscriber.

In this embodiment, the screen 70 contains a preview window 72 with indicia identifying the event that is being viewed, which in this example is a college wrestling dual meet between the University of Tennessee at Chattanooga (UTC) and Oklahoma State University (OSU), hosted at Oklahoma State University. In this example, OSU produced the video recording of the wrestling meet and submitted the same to the clearing house. The preview window 72 contains a number of thumbnail images 74 of specific segments of the video, which in this case are the wrestling events for each weight class. Here the thumbnails 74 are shown for the 125, 133, 141, 149, 157 and 165 pound classes. The thumbnails for the remaining weight classes (i.e., 174, 185, 197 and heavyweight) are obscured behind the video player window 76.

The clearing house creates the video player 76 as a custom player for the specific event, as is also the case for the preview window 72. The video material is edited at the clearing house to trim any dead time or idle time, such as time outs and injury time, and any unduly lengthy intervals before, between, or after the matches. Music track is added at the clearing house, if desired, and also in this case the video is divided into segments, i.e., individual matches or events, at the clearing house.

The recorded video material is converted to digital form at the clearing house, and a file is created. Sound, i.e., for background, can be added as a music file and imported to the video file. Then, if appropriate to the subject matter, an opening or introductory portion can be created with highlights and preliminary material. The clearinghouse produces several files of this, i.e., for each of the download speeds available. Other editorial steps can be performed, as mentioned before. The clearing house also creates the custom viewer, as shown here, for each recorded event, e.g., for each wrestling meet, swimming and diving competition, etc.

The custom video player 76 appears as a window on the screen of the subscriber's computer monitor. Here, there are speed selection buttons 78 that allow the subscriber to select a download speed that is appropriate for the subscriber's Internet connection, e.g., 128 Kbps, 384 Kbps, 500 Kbps. A viewing window 80 appears below these buttons, and this is where the videos are presented. There are size select buttons 82 beneath this, so that the viewing window can be enlarged or reduced in size. Here, the viewing window is shown in its original size, but this can be enlarged to double size or full screen size. At the upper part of the video player 76 are a video segment legend 84 that identifies the particular segment being played, which in this example includes the names of the schools and the particular weight class. Along one side of the video player is the school logo 86 of the host institution (the school that produced the video recording, i.e., OSU), and below that other material can be inserted, including an image 88 of the host institution's team mascot. This video player may have the name of the other school (or other institution), and there can be other items included here, e.g., advertising or announcements, or links to related items. The clearing house computer creates a different custom video player 76 for each school and for each competition that is to be webcast.

The arrangement of this invention has an affirmative socio-economic impact: Specifically, the system enables sports of all varieties and levels—high school, collegiate, club, amateur, and professional—with a chance to capture a world-wide audience via the Internet. These sports can avoid the high costs associated with normal video sports production and the high costs of normal television air time. These high costs have stood as a barrier to smaller, less commercializable sports organizations and teams. The system of this invention provides an economic solution to the problem, employing do-it-yourself production by means that are efficient, easy to operate, and undiscriminating. Because this system makes more sports and more teams and organizations available for viewing, the system will promote growth in viewership for all sports at all levels.

A second socioeconomic effect of this invention is a greater growth within the sporting goods field. The growth in audience to these sports events creates new advertising and marketing avenues for distributors and manufacturers of sports and sports related products. For example, by providing on-demand webcast of televised Ultimate Frisbee events, which is an activity of increasing popularity, the viewership of persons interested in that activity will be present on the Internet, and this creates highly-targeted advertising and marketing avenue for frisbees and related items such as water bottles, tee-shirts, and sports drinks, as well as a market for such products as bicycles, shampoo, and beverages. Because the costs of production and webcasting are relatively low, the advertising rates are held far below what is charged for television advertising.

With video programming of these so-called minor sports on the system, which can be reached for viewing via the Internet, the costs of scouting opposing teams and preparing for a contest are much reduced. The system also permits parents of student athletes to watch their children perform, regardless of the distance to the school at which their team is competing. Also, the system permits alumni (and alumnae) to stay in touch with their school's athletic program and to watch their favorite sports events. Cost and convenience are no longer factors in the video production of a sports event, and instead the focus is on the love of the game or sport.

As mentioned earlier, the system of this invention can be used for recording, archiving, and webcasting to viewers, other events, such as lectures, concerts, speeches, college commencement ceremonies. The system of this invention can be used effectively for continuing professional education, with only a minimum investment required at the hosting institution.

While the invention has been described with reference to a few selected embodiments, it should be recognized that the invention is not limited to those precise embodiments. Rather, many modifications and variations will be apparent to persons skilled in the art without departing from the scope and spirit of this invention, as defined in the appended claims.

I claim:

1. A self-help process of producing, storing, cataloging, and on-demand web casting of a multitude of minor-sport athletic events, each of which has a limited viewership but which in aggregate result in a significant volume of viewers, by self-help video production of a wide variety of minor-sport athletic events of interest to a wide number of groups of interested persons at each of a plurality of originating academic institutions, and of recording or storing, and processing and transmitting on demand the video recorded events to as wide as possible a field of subscribers, the athletic events being produced by respective ones of said originating academic institutions, and each event being categorized in an identifiable category of athletic events, wherein such minor-sport events are characterized by having an associated group of interested persons that is too small to support the cost producing a television broadcast of the event, and whereby each said originating academic institution needs only send in the recorded video production to a central clearing house and needs to take no further steps to make the video recordings ready for subscribers for access over a global computer network, the process comprising:

obtaining a video production of each of said minor-sport athletic events, by self-help, in-house capturing the event at said originating academic institution using at least one video camera and at least one microphone, such that the video productions each include at least one video channel and an audio channel;

said originating academic institution transmitting said video productions to the central digital clearing house, the clearing house having a computer processor for digitally processing each said video production to prepare the video channel and audio channel thereof for digital storage and retransmission, a digital memory arrangement with capacity sufficient for storing a multiplicity of said video productions; and a web transmitter for transmitting the stored video productions of said minor-spot athletic events to said subscribers on demand;

converting at said clearing house said video and audio channels of said video productions to a digital format suitable for webcasting, and storing same at storage locations on the associated digital memory arrangement;

the step of converting including editing the content of said video production at said clearing house without involving the originating institution to render it suitable for digital storage and transmission to a subscriber;

said clearing house creating a subscriber accessible catalog of the video productions stored in the memory arrangement at said clearing house, the catalog having categories including originating institution and type of event such that any said subscriber can select on each of said category of institution and type of event to select directly a particular event for viewing, by first selecting one of the category of originating institution and the category of type of sporting event, and then selecting from the other of said categories; and then selecting from a list of the sporting events of said type and of said originating institution;

said clearing house providing to said wide field of subscribers digital access, via said global computer network, to the video recordings of the events as stored on the memory arrangement at said clearing house, including providing each said subscriber access via said global computer network to said catalog, permitting the subscriber to select from the categories of originating institution and type of event of said catalog, and permitting the subscriber to select a desired video production by pointing and selecting from the video productions within said categories; and said clearing house transmitting to said subscriber the selected video production over said global computer network.

2. The process of producing and transmitting of video events according to claim 1 wherein step of obtaining a video production includes recording the captured event on a portable physical video recording medium, and said step of transmitting includes physically transporting said portable recording medium via a public express service to said clearing house.

3. The process of producing and transmitting of video events according to claim 1 wherein said originating institutions include academic institutions having athletic programs, and said categories include sports events at said academic institutions.

4. The process of producing and transmitting of video events according to claim 1 wherein said step of transmitting includes supplying, via a video channel, the video and audio channels in real time to said clearing house; and said clearing house providing to subscribers with access authorization the video and audio channels in real time to said clearing house, and said clearing house providing to subscribers with access authorization said video and audio channels in real time as a live web video presentation, and also recording said event for digital storage and retransmission in said digital memory arrangement.

5. The process of producing and transmitting of video events according to claim 1 wherein the step of obtaining a video production of said events includes obtaining images from two cameras, feeding both said images to a control module having two video screens, and employing a control means to select one or the other of said images.

6. The process of producing and transmitting video events according to claim 1, wherein said editing at said clearing house includes inserting titling and graphics concerning the event onto the stored video programs.

7. The process of producing and transmitting video events according to claim 1, the process further comprising creating at said clearing house a custom video player for each said video production to be transmitted to the subscriber when the subscriber selects said video production.

8. The process of producing and transmitting video events according to claim 7, further comprising including on said video player indicia identifying the subject of said video production.

9. The process of producing and transmitting video events according to claim 8, wherein said indicia include a logo of said originating academic institution.

10. The process of producing and transmitting video events according to claim 1, wherein said step of editing includes dividing said video production into segments, and providing indicia for selecting desired ones of said segments.

11. The process of producing and transmitting video events according to claim 10, wherein said providing indicia includes providing pre-view thumbnails of each said video segment that the subscriber can select to commence viewing the respective segment.

12. The process of producing and transmitting video events according to claim 1, wherein said step of editing at said clearing house includes trimming unwanted portions of the video production.

13. The process of producing and transmitting video events according to claim 1, wherein said converting at the clearing house includes creating several files of each said digital video production, each at a respective different download steed.

14. The process of producing and transmitting video events according to claim 13, including providing the subscriber with a plurality of speed select buttons to permit the subscriber to select a download speed for the selected recorded video production that is appropriate to the subscriber's connection to the global computer network.

15. The process of producing and transmitting video events according to claim 1, further comprising placing targeted commercial announcements on said screen to said subscriber when presenting the selected sporting event thereon; said clearing house selecting such commercial announcements from categories of advertisers related to the associated type of sporting minor-athletic event.

16. The process of producing and transmitting video events according to claim 1, wherein said minors sports events are selected from the group that consists of track meets, wrestling meets, swimming and diving meets, tennis matches, and Ultimate Frisbee contests.

17. The process of producing and transmitting video events according to claim 1, wherein said minor sports events include only sports other than football and basketball.

18. A process for self-help video production of minor-sport athletic events of interest to groups of interested persons at each of a plurality of originating academic institutions, wherein such minor-spot athletic events are characterized by having an associated group of interested persons that is too small to support the cost of producing a television broadcast of the event, and said athletic events are of a nature that such events consists of a plurality of discrete sub-events; and of recording or storing, and processing and transmitting on demand the video recorded events to subscribers among said groups of interested persons, the events being produced by respective ones of said originating institutions, and each minor-sport athletic event being categorized in an identifiable category of events, whereby the originating academic institution needs only send in the recorded video production to a central clearing house and needs to take no further steps to make the video recordings ready for subscribers for access over a global computer network, the process comprising:

is obtaining a video production of each of said events, by self-help, in-house capturing the event at said originating academic institution using at least one video camera and at least one microphone, such that the video productions each include at least one video channel and an audio channel;

said originating academic institution transmitting said video productions to the central digital clearing house, the clearing house having a computer processor for digitally processing each said video production to prepare the video channel and audio channel thereof for digital storage and retransmission, a digital memory arrangement with capacity sufficient for storing a multiplicity of said video productions; and a web transmitter for transmitting the stored video productions of said events to said subscribers on demand;

converting at said clearing house said video and audio channels of said video productions to a digital format suitable for webcasting, and storing same at storage locations on the associated digital memory arrangement;

the step of converting including editing the content of said video production at said clearing house without involving the originating academic institution to render it suitable for digital storage and transmission to a subscriber;

said clearing house creating a subscriber accessible catalog of the video productions stored in the memory arrangement at said clearing house, the catalog having categories including originating academic institution and type of event such that the subscriber can select on each of said category of institution and type of event to select a particular event for viewing;

said clearing house providing to a plurality of subscribers digital access, via said global computer network, to the video recordings of the events as stored on the memory arrangement at said clearing house, including providing each said subscriber access via said global computer network to said catalog, permitting the subscriber to select from the categories of originating academic institution and type of event of said catalog, and permitting the subscriber to select a desired video production by pointing and selecting from the video productions within said categories; and said clearing house transmitting to said subscriber the selected video production over said global computer network;

the process comprising creating at said clearing house a custom video player for each said video production to be transmitted to the subscriber when the subscriber selects said video production; and further comprising creating at said clearing house a preview window containing video modules for identifying segments of said video production that correspond to associated sub-events within said minor-sports athletic event; the subscriber pointing to and selecting a desired one of said modules; and the clearing house presenting to the subscriber the segment identified in said module of the selected sub-event segment of said video production when the subscriber selects a given one of said modules.

\* \* \* \* \*

UNITED STATES PATENT AND TRADEMARK OFFICE
CERTIFICATE OF CORRECTION

PATENT NO. : 7,340,765 B2  Page 1 of 1
APPLICATION NO. : 11/220028
DATED : March 4, 2008
INVENTOR(S) : Robert H. Feldmeier It is certified that error appears in the above-identified patent and that said Letters Patent is hereby corrected as shown below:

Col. 10, Claim 1, line 53:   "cost producing" should read --cost of producing--

Col. 11, Claim 1, line 7:   "minor-spot" should read --minor-sport--

Col. 12, Claim 13, line 41:   "steed" should read --speed--

Col. 12, Claim 15, line 54:   "sporting minor-athletic event" should read --minor-sports athletic event--

Col. 13, Claim 18, line 15:   the word "is" should be deleted

Signed and Sealed this

Tenth Day of June, 2008

JON W. DUDAS
*Director of the United States Patent and Trademark Office*